United States Patent [19]

Durand

[11] Patent Number: 4,648,269
[45] Date of Patent: Mar. 10, 1987

[54] SPEED MEASURING DEVICE FOR A HELICOPTER

[76] Inventor: Bernard Durand, Chemin Vidal, Route d'Arles, 13300 Salon, France

[21] Appl. No.: 751,553

[22] Filed: Jul. 3, 1985

[30] Foreign Application Priority Data

Jul. 6, 1984 [FR] France .............................. 84 10736

[51] Int. Cl.⁴ ............................................ G01C 21/10
[52] U.S. Cl. ............................... 73/178 H; 244/17.13
[58] Field of Search .................... 73/178 H; 244/17.13

[56] References Cited

U.S. PATENT DOCUMENTS 4,023,409 5/1977 Durand ............................ 73/178 H

FOREIGN PATENT DOCUMENTS 2282644 12/1976 France .

Primary Examiner—Donald O. Woodiel
Attorney, Agent, or Firm—Parkhurst & Oliff

[57] ABSTRACT

The invention relates to the technical field of pilotage aids for helicopters. In a speed measuring device having two measuring devices for longitudinal speed and lateral speed of the helicopter, each measuring device comprises a single sensor (9a, 9b) for sensing the position of the cyclic rotor pitch control along the axis concerned, and for sensing the acceleration component along the same axis. Each measuring device further includes a computer to provide the air speed components of the helicopter. Applications include flight testing, and the construction of firing computers and flight computers.

10 Claims, 4 Drawing Figures

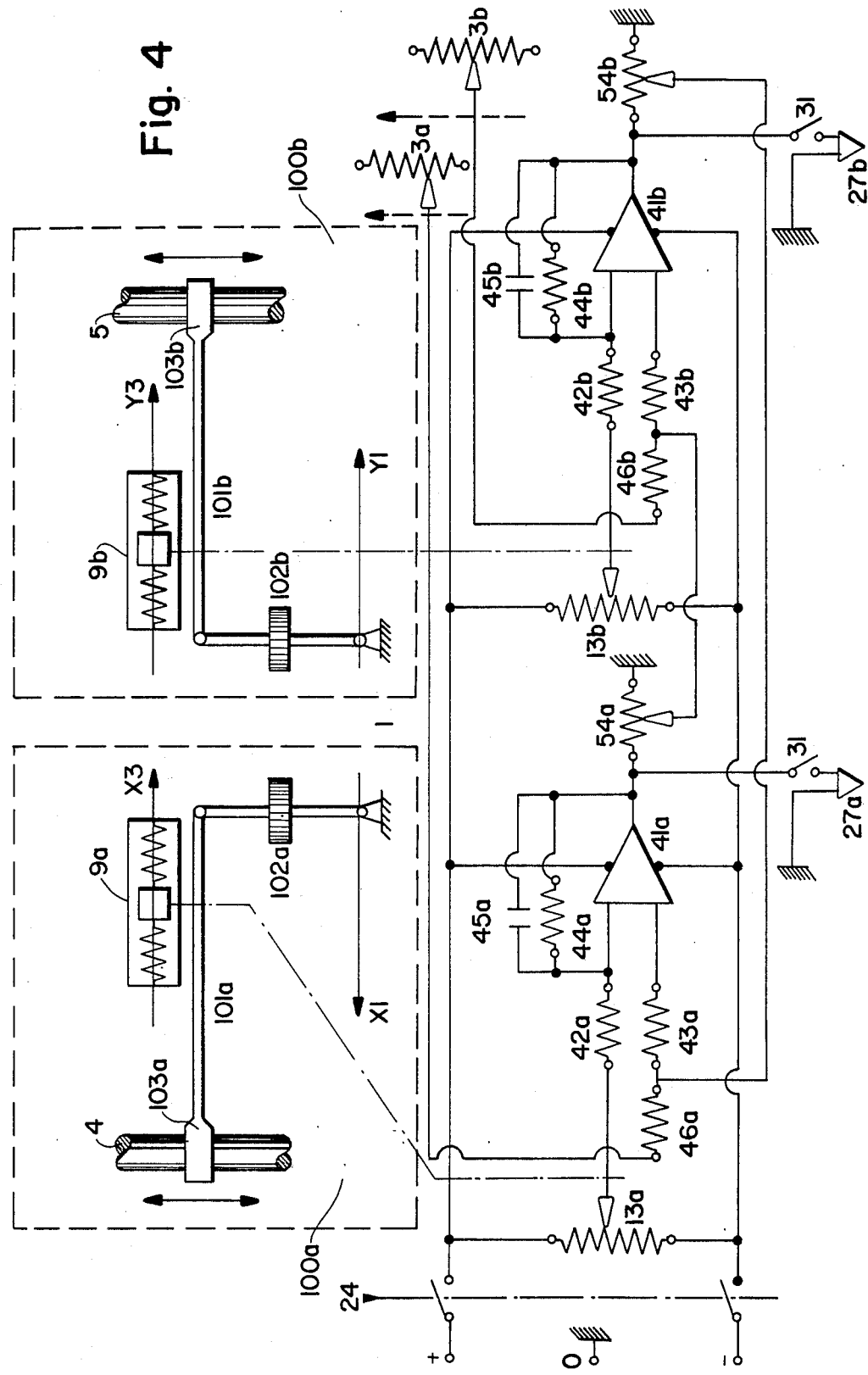

SPEED MEASURING DEVICE FOR A HELICOPTER

TECHNICAL FIELD

This invention relates to a device to measure the air speed of a helicopter particularly near hovering flight.

BACKGROUND OF THE INVENTION

Known apparatus have certain problems near hovering flight because the sensors typically used are not very accurate at the low dynamic pressures associated with the low speeds to be measured.

In addition, prior sensors do not permit easy measurement of speed oriented in any direction, particularly toward the rear or laterally, which is one of the principal advantages of the helicopter.

In addition to dynamic pressure sensors, French Pat. No. 1567 128 suggests installing in the airflow of the rotor a system with two yaw meters oriented respectively along the longitudinal and transverse axes of the helicopter.

That device, which is generally effective, nonetheless has some limitations due to its external location and to its relative fragility which requires frequent maintenance and which is too burdensome for a mass-produced helicopter.

French Pat. No. 2282644 (which corresponds to U.S. Pat. No. 4,203,409) relates to a device comprising two measuring devices (one for the longitudinal and the other for the transverse speed component) wherein each measuring device includes both a position detector for cyclic rotor pitch control along the axis concerned, and a detector for the acceleration component along the same axis, as well as related measuring implements to provide integration of the algebraic sum of the values measured by the two corresponding detectors.

This device functions very well and with remarkable precision, but nonetheless remains relatively expensive, which excludes its use for low-priced or mass-produced helicopters.

SUMMARY OF THE INVENTION

The present invention is intended to solve this problem by providing an improved device, similar to that shown in French Pat. No. 2282644 which is simpler to use and easier to adjust without any degradation of performance in the low speed zone, and which enables the operation to extend to all types of helicopter flight.

Thus, the invention relates to a device to measure, particularly near hovering speeds, the air speed of a helicopter having at least one lifting rotor, and a cyclic rotor pitch control system operated by means of a control stick, the device comprising two substantially identical measuring devices connected to a dual indicator and corresponding respectively to the displacement of the helicopter along its longitudinal axis and along its transverse axis and comprising, in combination, computing means which is distinguished from the present state of the art particularly by the fact that each measuring device comprises a single detector for the cyclic rotor pitch control position along the axis concerned and for the acceleration component along the same axis, and by the fact that the computing means provides integration of the output signal of the single sensor of each measuring device to provide the airspeed components of the helicopter, in relation to the axes concerned, to all types of devices, particularly direct reading control indicators, an automatic pilot, a navigation system, or a firing computer.

More precisely, the invention is adapted for use in a helicopter, the rotor of which includes a cyclic path variation control system controlled by at least one longitudinal control rod situated substantially in the plane passing through axis $Z_1-Z_2$ of the rotor and the longitudinal axis $X_1-X_2$ of the fuselage, and controlled by a transverse control rod situated substantially in a plane perpendicular to the preceding plane and defined by axis $Z_1-Z_2$ of the rotor and transverse axis $Y_1-Y_2$ of the main rotor, the two rods being substantially parallel to axis $Z_1-Z_2$ of the rotor. The invention consists essentially of placing a single detector for cyclic rotor pitch control along each axis concerned, each detector capable of detecting the acceleration component along the same axis, and each device comprising an accelerometer positioned to operate respectively in the longitudinal vertical plane ($X_1-X_2$, $Y_1-Y_2$) for the measuring device of the longitudinal component, and in the transverse vertical plane ($Y_1-Y_2$, $Z_1-Z_2$) for the measuring device of the transverse component. Each accelerometer is located on a platform linked to detect the vertical displacement of the rod concerned, the output signal of each accelerometer being transmitted to the computing means by a wire linkage.

In one embodiment, the platforms are positioned in such a way that their movements occur on both sides of planes substantially parallel to reference plane ($X_1-X_2$, $Y_1-Y_2$) by rotation around an axis parallel to one of the principal axes of the helicopter ($Y_1-Y_2$, $X_1-X_2$, respectively). In another embodiment, the platforms are positioned in such a way that their movements occur on both sides of a plane inclined in relation to the reference plane ($X_1-X_2$, $Y_1-Y_2$) by rotation around an axis parallel to one of the principal axes of the helicopter ($Y_1-Y_2$, $X_1-X_2$, respectively) to compensate for secondary effects such as distortion of rotor flow or specific characteristics of helicopter construction.

In a preferred embodiment of the invention, the platforms are comprised of a plate of which one extremity is linked to the corresponding cyclic pitch control rod by means of a hinge, and of which the other extremity is connected to the airframe of the helicopter by means of a link of adjustable length, for example made of a double reverse threaded rod controlled by a double lockable reverse threaded nut.

Other characteristics of the invention, as well as an embodiment of the computing means operating in conjunction with each of the measuring devices will be described in the additional description to follow, accompanied by the following drawings.

BRIEF DESCRIPTION OF THE DRAWINGS

FIG. 4 is a circuit diagram showing the computing means linked to the detectors of each measuring device.

DETAILED DESCRIPTION OF THE PREFERRED EMBODIMENTS

Figure 1:
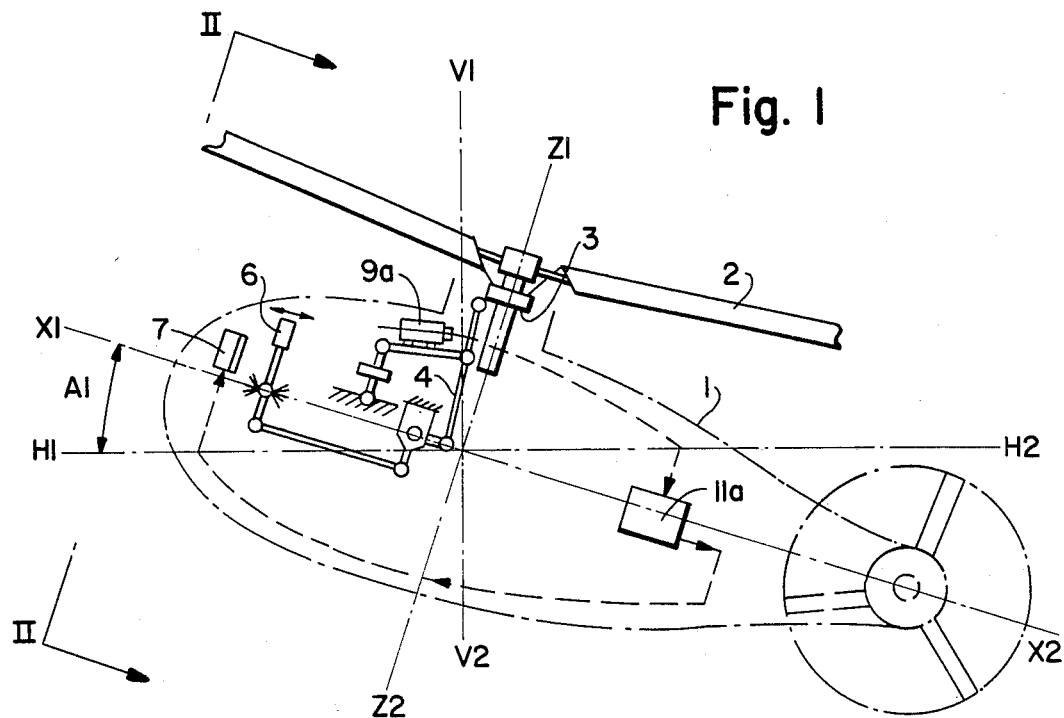
FIG. 1 is a longitudinal section showing a schematic representation of a helicopter equipped with a measuring device in accordance with the invention.
Figure 2:
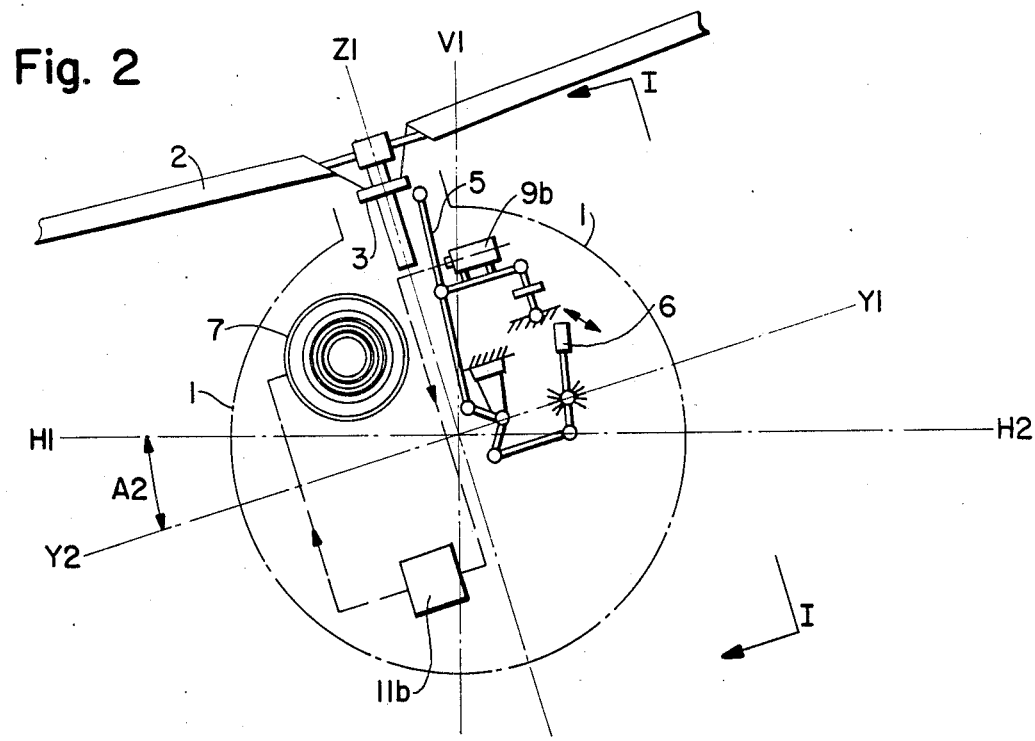
FIG. 2 is a cross-section along II—II of FIG. 1.

In the embodiment shown in FIGS. 1 and 2, the helicopter equipped with the speed measuring device in accordance with the invention includes a fuselage 1 to which rotor 2 is connected. Rotor 2 includes a cyclic pitch variation control system, consisting of a double swashplate 3, the lower part of which is mounted on the gimbal joint on fuselage 1 and subject to the action of the two rods 4, 5 substantially parallel to axis Z1–Z2 of rotor 2. Rod 4, called the longitudinal control rod, is substantially situated in a plane passing through axis Z1–Z2 of the rotor and the longitudinal axis X1–X2 of the fuselage 1. Rod 5, called the transverse control rod, is situated in a plane substantially perpendicular to the preceding plane, and defined by axis Z1–Z2 of the rotor and transverse axis Y1–Y2 of the fuselage. The two control rods 4, 5 are operated by means of a control stick 6.

The measuring device of the type described in the invention includes two substantially identical measuring devices corresponding respectively to the speed component of the helicopter along longitudinal axis X1–X2 and along transverse axis Y1–Y2. In contrast to other aircraft, the helicopter can orient its speed in any direction in the plane defined by the above-mentioned axes, the aim of the invention being, as has been stated, to enable such speed to be measured satisfactorily.

According to the invention, the longitudinal measuring device comprises a detector 9a to detect the position of the cyclic rotor pitch control along the longitudinal axis and simultaneously the acceleration component along the same axis, and the transverse measuring device 9b to detect the corresponding parameters along the transverse axis.

According to this embodiment of the invention, detectors 9a and 9b each comprise an accelerometer positioned to operate respectively along a longitudinal horizontal axis and along a transverse horizontal axis in order to detect respectively the longitudinal and transverse acceleration components.

In a variation, the accelerometers of each measuring device can be positioned to operate along measurement axes different from the longitudinal and transverse axes in order to compensate for a possible distortion of the rotor flow or for phase shifts in the flapping of the blades.

According to one characteristic of the invention, the positioning of the single detector for each measuring device permits the position of the cyclic rotor pitch control along the axis concerned to be taken into account as well. To accomplish this, accelerometers 9a and 9b are positioned on platforms 100a and 100b hinged on one of their extremities in relation to the airframe of the helicopter and connected by their other extremity to the corresponding control rod (4 and 5 respectively) by a hinge in such a way that, when each control 4 or 5 is moved, the accelerometer of each corresponding measuring device moves on both sides of a substantially horizontal plane by rotation around an axis parallel to one of the principal axes of the helicopter.

In a practical embodiment, platform 100a comprises a plate 101a joined to control rod 4 by a hinge such as a ball joint 103a and hinged by its free extremity to a link of adjustable length 102a, which can be constructed in a known manner by means of a double reverse threaded rod held with a reverse threaded nut, in order to permit adjustment of the static position of platform 100a. The same measures are taken concerning the positioning of accelerometer 9b positioned on platform 100b oriented perpendicular to platform 100a.

In a variation of the embodiment, platforms 100a and 100b will be positioned in such a way that their movements will occur around a plane inclined in relation to the horizontal, for example to compensate for specific characteristics of helicopter construction such as static inclination of the airframe in relation to the horizontal.

FIG. 4 is a diagram of a practical embodiment of the computing means connected to each measuring device.

The outlet of each accelerometer 9a, 9b is connected to the movable connection of a potentiometer 13a, 13b and connected, respectively, by a resistor 42a, 42b to the negative input of an operational amplifier 41a, 41b in such a way as to obtain a signal with power amplified by resistor 42a, 42b and a resistor 44a, 44b positioned as a feedback, and filtered, the time constant of the system being provided by R-C circuit 44a, 45a (44b, 45b).

Figure 3:
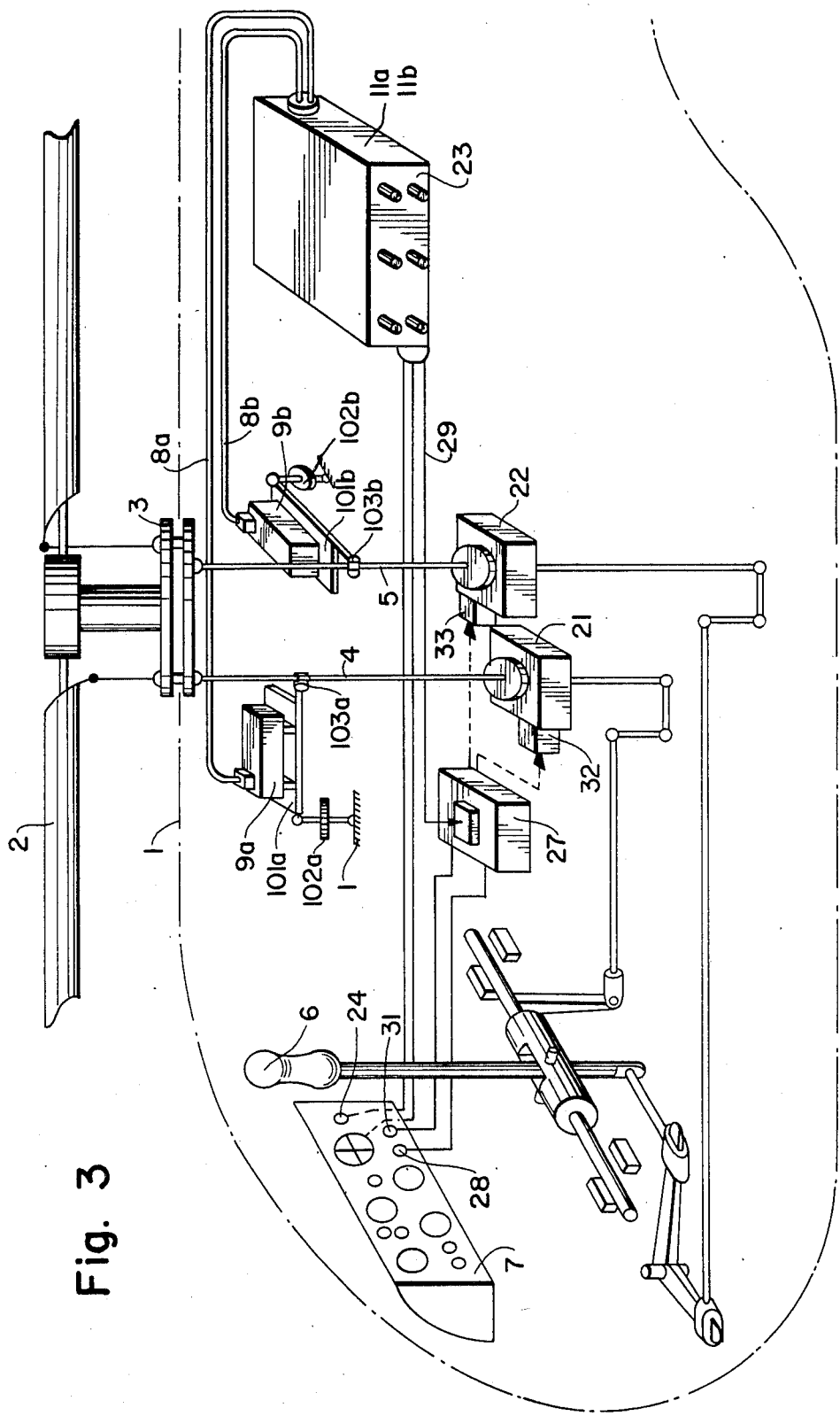
FIG. 3 is a schematic representation in perspective of the installation of the measuring device in accordance with the invention in a helicopter equipped with rotor servo-commands.

The output voltage of each operational amplifier is applied to double line 29 controlled by switch 31 of control circuits 27a, 27b of the automatic pilot 27 (see also FIG. 3).

A fraction of the output voltage of the "longitudinal" device is applied by means of a potentiometer 54a and a resistor 43b to the positive input of amplifier 41b of the "transverse" device.

The same thing is done for a fraction of the output signal of the "transverse" device applied to the positive input of the "longitudinal" device by means of potentiometer 54b and resistor 43a, in order to monitor and reduce if necessary by adjusting the potentiometers 54a, 54b, possible interactions between the two circuits such as the variations of the control position of the rotor due to possible variations of the speed component measured by one of the circuits.

Computing means 23 are connected to the output of accelerometers 9a, 9b to control an automatic pilot 27 (FIG. 3), and possibly also a dual indicator 7 which can comprise two crossed bars which are both mobile in relation to a background to represent the algebraic values of each speed component along reference axes X1–X2, Y1–Y2.

Referring to FIGS. 3 and 4, the outputs of accelerometers 9a and 9b are electrically connected to the mobile terminal of a measuring potentiometer 13a, 13b, the output signal of which controls the computing means.

Rotor 2 has servocontrols 21, 22, connected to rods 4, (FIG. 3), to which are hinged the two platforms 100a and 100b bearing the accelerometers 9a, 9b, between the swashplate 3 and servocontrols 21, 22. The computing means of each device, as well as other circuits described below, are contained in housing 23. A control switch 24, located on the instrument panel, enables the pilot to operate the measuring device.

The helicopter as represented in the drawings is equipped with an automatic pilot 27, operated by means of a supply switch 28. To operate the automatic pilot 27, the computing means can form command signals, for example in the form of electric voltage transmitted to the automatic pilot by a specific line 29, controlled by switch 31. In a known manner, the automatic pilot 27 acts on servocontrols 21, 22, for example by means of electrovalves 32, 33 (FIG. 3), connected to a system of fluid under pressure (not shown).

In a variation of the embodiment, the computing means 23 comprising operational amplifiers 41a, 41b and their related electronics can be integrated into a single digital and/or analog computer system which carries out varied functions such as automatic pilot, flight control computer and/or firing control computer, and/or a navigation computer, this being done by means of integrated circuits, the computing means being well suited to recalculating the values of the cyclic pitch positions and accelerations in order to form control signals which can assist in-flight control.

The operation of the device described is explained hereinafter. When the helicopter is in flight (FIGS. 1 to 3), operated by means of a control stick 6, sensors 9a, 9b measure the longitudinal and transverse components of acceleration substantially along longitudinal axis X1-X2 and transverse axis Y1-Y23 respectively, the longitudinal and lateral components thus measured being assigned a coefficient that takes into account the cyclic pitch control variation in the plane concerned because the measurement axis of each accelerometer 9a, 9b moves proportionally to the variation in cyclic pitch control since sensors 9a, 9b are located on plates linked to the movements of control rods 4, 5.

In the fixed cyclic pitch control position, the device in accordance with the invention reacts like a device comprising a separate acceleration sensor and position sensor for cyclic pitch control (per measuring device), to a longitudinal or lateral acceleration of the helicopter.

As soon as the cyclic pitch position varies, the immediate variation in the setting of plates 101a, 101b causes an immediate variation in the setting of the accelerometers and thus in the value of the acceleration measured, consisting essentially of gravity, in the uniform flight phase. This variation is equal to the one which would have been caused by a cyclic displacement detector acceptably adjusted in accordance with the principles of adjustment of helicopter flight controls mentioned above.

The two longitudinal and lateral cyclic pitch controls of almost all helicopters are based on the same principle, as follows.

If the helicopter is on the ground, rotor stopped, and one of the blades is called P1:

The angular position of P1 in its rotation around axis Z1-Z2 when the entire rotor is mechanically driven (by the motor) is called angle $\Psi$ (psi), which is formed by the longitudinal axis of the blade with reference X1 of the fuselage.

On all helicopters there are four specific positions for each blade called "canonical positions" characterized by four specific values of angle $\Psi$. These four values are the same for all of the blades. The four canonical values are very close to 0, 90, 180 and 270 degrees. They are adjusted mechanically by the manufacturer when the flight control plans are drawn up. These values cannot go out of adjustment and are marked with reference marks for maintenance operations.

The four canonical positions are called I, II, III, and IV, respectively. Positions I and III are of course on a single rotor diameter, substantially aligned with fuselage axis X1-X2.

Positions II and IV are also on a single rotor diameter, substantially aligned with the transverse axis Y1-Y2 of the fuselage.

Each blade is, in addition, hinged in rotation around its own longitudinal axis. This freedom enables the pitch of each blade to be controlled, by means of the traditional operating mechanism (the fixed and mobile swashplates of FIG. 4). The "fixed" swashplate itself is controlled in pivoting ($\pm$approximately 20 degrees) around two rectangular axes CX1 and CY1 by the two cyclic pitch controls 21 and 22 shifted angularly in relation to the principal axes of the helicopter.

The mechanical setting of the unit is such that if blade P1 is in canonical position I or III, a pure fore-and-aft motion of cyclic pitch stick 6 will not cause any pitch variation on P1; but a left-right movement of stick 6 will cause a maximum pitch variation on P1. If blade P1 is in canonical position II or IV, a pure fore-and-aft motion of stick 6 causes a maximum pitch variation on P1; but a left-right movement of stick 6 does not cause any pitch variation. The direction of the pitch variation caused is the inverse for the two canonical positions that differ by 180 degrees.

The average value of the pitch in relation to which the cyclic pitch variation occurs is determined by the position of the swashplate along rotor axis Z1-Z2. That position is controlled by the "collective pitch" lever of the pilot.

A preferred method of control the sensitivity of the device described in the invention is as follows:

With the helicopter on the ground, blade P1 is placed in canonical position I, thus substantially to the front.

Cyclic pitch stick 6 is moved from the extreme left to the extreme right, after an instrument to measure the pitch rotation has been mounted on blade P1. For a rotor which turns clockwise it will be seen that the pitch value of P1, to be called GP1, varies negatively (said to be "diving") when stick 6 moves right. The total variation of GP1 in this test shall be called DGP1.

Without the device in accordance with the invention, the longitudinal cyclic sensitivity is generally described as the ratio DGP1/100, expressed in degrees by %.

In practice, the curve GP1=f(VLA1) is determined, where VLA1 represents an electric voltage representative of the lateral cyclic pitch position, and the best possible linearity is sought either by means of a careful mechanical design of the operating mechanism or by means of electronic corrections of any non-linearity.

In this way a measurement of the lateral cyclic sensitivity is obtained by means of the ratio DGPL/DVLA1=STLA.

In the same way, longitudinal cyclic sensitivity STLO is measured by placing P1 in canonical position II or IV and by moving stick 6 from the extreme aft to the extreme fore. Measurement DGP2 of the total pitch variation of P1 compared with measurement DVLO1 of the variation in longitudinal cyclic pitch control will express the longitudinal cyclic sensitivity DGP2/DVLO1=STLO.

To adjust the device in accordance with the invention, if the adjustment conditions on the group described above are fulfilled, with a helicopter possessng the installation of FIG. 4, it will be seen that:

If cyclic pitch stick 6 is moved from the extreme fore to the extreme aft, mechanical support 100a will show a total variation in longitudinal inclination equal to DISLO. This value depends solely on the lever arms used in construction.

More particularly, these lever arms can be adjusted in such a fashion that DISLO is exactly equal to value DGP1 seen above.

To carry out the adjustment of zero air speed, the only reliable procedure on a new helicopter consists, once the installation is operable and perfectly adjusted as described above, of hovering in calm air at a low and constant speed.

By means of a measurement of the indicated speeds of the two air components out with the helicopter hovering in relation to the ground outside the effect of the ground, a simple procedure with four flight headings spaced 90 degrees apart will permit fine tuning of this adjustment.

A device such as the one described in the present disclosure thus makes it possible to measure precisely, and with a simple initial adjustment of the equipment, the lateral and longitudinal components of a helicopter near hovering flight and perhaps to act on the servo-commands for rotor pitch variation in order to provide correction of the automatic pilot or of the other navigation or firing control systems.

In order to compensate in particular for power variations of the helicopter which affect its longitudinal and transverse equilibrium, the device is equipped on each measuring device for lateral or longitudinal speed with a potentiometer $3a$, $3b$ connected by means of its movable connection to the positive input of amplifier $41a$, $41b$ through a resistor $46a$, $46b$ to introduce into the measuring device a corrective parameter such as the value of the collective pitch of the rotor, which is representative of power variations.

In a variation of the embodiment, instead of using accelerometers positioned along the principal axes of the helicopter, platforms $100a$ and $100b$ can be operated by mechanical means wherein the movement is the result of the combination of the movements of the longitudinal 4 and transverse 5 control rods in order to take into account possible dephasing in the flapping response of the blades.

The simplicity of the techniques developed and the integration of the device into an overall computer allow the use of the device in all mass-produced helicopters for use during initial test centers as well as to provide pilotage assistance during daily use.

What is claimed is:

1. A device for measuring, particularly near hovering flight speeds, the air speed of a helicopter comprising:
    at least one lifting rotor and a cyclic rotor pitch control system operated by means of a control stick;
    two substantially identical measuring devices connected to a dual indicator and responding, respectively, to the displacement of the helicopter along its longitudinal axis and along its transverse axis; and
    computing means; wherein each measuring device comprises a single detector for detecting both the position of the cyclic rotor pitch control system along one of the longitudinal axis and the transverse axis and the acceleration component along the same axis, and wherein the computing means provides the integral of the output signal of the single sensor of each measuring device in order to provide the airspeed components of the helicopter in relation to the respective axes.

2. A device in accordance with claim 1, for a helicopter in which the rotor comprises a cyclic pitch variation control system controlled by at least one longitudinal control rod situated substantially in a first plane passing through an axis Z1-Z2 parallel with the axis of the rotor, and a longitudinal axis X1-X2 parallel with the longitudinal dimension of the fuselage of the helicopter, and one transverse control rod situated substantially in a plane perpendicular to the first plane and defined by axis Z1-Z2 of the rotor and the transverse axis Y1-Y2 of the fuselage, both rods being substantially parallel to axis Z1-Z2 of the rotor, wherein each detector of the cyclic rotor pitch control position along the respective axis and of the acceleration component along the same axis comprises an accelerometer positioned respectively to operate in the vertical longitudinal plane (X1-X2, Y1-Y2) for the measuring device of the longitudinal component, and in the vertical transverse plane (Y1-Y2, Z1-Z2) for the measuring device of the transverse component, each detector being positioned on a platform connected to the respective vertical displacement of the rod concerned, the output signal of each detector being transmitted to the computing means by means of a wire linkage.

3. A device in accordance with claim 2, wherein the platforms are positioned in such a way that their movements occur on both sides of planes approximately parallel to the reference plane (X1-X2, Y1-Y2) by rotation around an axis parallel to one of the principal axes of the helicopter (Y1-Y2, X1-X2 respectively).

4. A device in accordance with claim 2, wherein the platforms are positioned in such a way that their movements occur on both sides of a plane inclined in relation to the helicopter reference plane (X1-X2, Y1-Y2) by rotation around an axis parallel to one of the principal axes of the helicopter (Y1-Y2, X1-X2 respectively) to compensate for the distortion in rotor flow.

5. A device in accordance with claim 4, wherein the platforms are made of a plate of which one extremity is linked to a corresponding cyclic control rod by means of a hinge, and of which the other extremity is connected to the airframe of the helicopter by means of a link of adjustable length.

6. A device in accordance with claim 5, wherein the adjustable link is comprised of double reverse-threaded rod controlled by a double reverse threaded braking nut.

7. A device in accordance with claim 6, wherein the accelerometer constituting the single detector controls the displacement of the mobile terminal of a potentiometer and wherein the computing means includes for each measuring device, respectively, an operational amplifier of which the negative input is connected to the mobile terminal of the potentiometer by means of a resistor, the positive input of the operational amplifier being connected to he mobile terminal of a potentiometer of which one extremity is grounded and the other extremity is connected to the output of the operational amplifier of the other measuring device.

8. A device in accordance with claim 7, wherein the measuring device further includes an automatic pilot that receives as an input the output signals of the amplifiers.

9. A device in accordance with claim 7, wherein each measuring device comprises a potentiometer connected by its mobile terminal to the positive input of the amplifier in order to introduce into the measuring device a corrective parameter such as the value of the collective pitch of the rotor.

10. A device in accordance claim 9, wherein the computing means are integrated into a single computer system comprising an automatic pilot, and wherein the computing means are able to recalculate the cyclic pitch position and acceleration values in order to form control signals which will assist pilotage.

* * * * *